US011023350B2

(12) United States Patent
Salunke et al.

(10) Patent No.: US 11,023,350 B2
(45) Date of Patent: Jun. 1, 2021

(54) TECHNIQUE FOR INCREMENTAL AND FLEXIBLE DETECTION AND MODELING OF PATTERNS IN TIME SERIES DATA

(71) Applicant: Oracle International Corporation, Redwood Shores, CA (US)

(72) Inventors: Sampanna Shahaji Salunke, Dublin, CA (US); Dustin Garvey, Exeter, NH (US); Sumathi Gopalakrishnan, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 316 days.

(21) Appl. No.: 16/256,228

(22) Filed: Jan. 24, 2019

(65) Prior Publication Data
US 2019/0370143 A1    Dec. 5, 2019

Related U.S. Application Data

(60) Provisional application No. 62/677,952, filed on May 30, 2018.

(51) Int. Cl.
*G06F 11/34* (2006.01)

(52) U.S. Cl.
CPC ...... *G06F 11/3419* (2013.01); *G06F 11/3433* (2013.01); *G06F 11/3447* (2013.01); *G06F 11/3452* (2013.01); *G06F 11/3457* (2013.01); *G06F 11/3495* (2013.01); *G06F 2201/81* (2013.01); *G06F 2201/88* (2013.01)

(58) Field of Classification Search
None
See application file for complete search history.

(56) References Cited

U.S. PATENT DOCUMENTS

2018/0034779 A1\* 2/2018 Ahuja ............... G06F 16/90344
2020/0257608 A1\* 8/2020 Fradkin ............. G05B 23/0254

\* cited by examiner

*Primary Examiner* — Craig C Dorais
(74) *Attorney, Agent, or Firm* — Invoke (57) ABSTRACT

The present disclosure describes a flexible technique to learn patterns in time series data that recur over time. The patterns may be used for simulation, predicting future behavior, or detecting anomalies in a system in which the data is collected. The technique incrementally detects daily, weekly, monthly, and yearly patterns. Each pattern is built over time instead of requiring all the data to be available at the beginning of the analysis. Instead of modeling each pattern explicitly, each pattern is described in the context of a day and formed based on time series data collected over an entire day. An example use of the technique is detecting load patterns in a computer system. A metric of system load such as CPU utilization may be collected periodically over a day. The techniques presented herein capture multiple daily models, each representing a different load pattern.

14 Claims, 7 Drawing Sheets

```
function = create_update_pattern(timeseries, patterns):

days = split_into_days(timeseries)
    for each day in days:
        pattern_fit = false
        for each pattern in patterns:
            if day_fits_pattern_test(day, pattern) == true:
                pattern_fit = true
                update AdditiveHoltWinters model (level, trend, seasonal factors)
                    if model is not yet initialized, initialize it
                update uncertainty of AdditiveHoltWinters model
                update occurrences count
                    occurrences counts maintained are: day_of_week, day_of_month, day_from_end_of_month, day_of_year
                update opportunities count
                    opportunities counts maintained are: day_of_week, day_of_month, day_from_end_of_month, day_of_year
                update last_updated timestamp
                update age_in_days
        if pattern_fit == false:
            create new AdditiveHoltWinters model
            set initialization series (i.e., the day's time series - model is not initialized yet)
            set occurrences count
                occurrences counts maintained are: day_of_week, day_of_month, day_from_end_of_month, day_of_year
            set opportunities count
                opportunities counts maintained are: day_of_week, day_of_month, day_from_end_of_month, day_of_year
            set last_updated timestamp
            set age_in_days to 1 function = day_fits_pattern_test(day, pattern):

if pattern.AdditiveHoltWinters model is not initialized:
        pattern.values = initialization series
    else
        pattern.values = predict(AdditiveHoltWinters model.level, trend and seasonal factors)
    if intraclass correlation coefficient(day.values, pattern.values) > 0.6
        fits = true
    else
        fits = false
    return fits
```

TECHNIQUE FOR INCREMENTAL AND FLEXIBLE DETECTION AND MODELING OF PATTERNS IN TIME SERIES DATA

INCORPORATION BY REFERENCE

This application claims priority to provisional application No. 62/677,952 filed on May 30, 2018, and entitled "Technique For Incremental And Flexible Detection And Modeling Of Patterns In Time Series Data," the disclosure of which is incorporated by reference herein in its entirety.

TECHNICAL FIELD

The present disclosure relates to characterizing patterns in time series data. More specifically, the disclosure relates to incremental pattern detection for future prediction of, or detecting anomalies in, computer system loads.

BACKGROUND

Monitoring enterprise systems is a challenging and complex task. The load on enterprise systems can vary dramatically at various times of the day or week. Information Technology (IT) system loads may follow recurring time patterns, e.g., low load on weekends and increased loads on weekdays. Additionally, IT loads may follow longer term patterns—e.g., a system dealing with payroll may have additional load near the end of the month or in the first few days of the month. Such recurring behavior varies from system to system. One way of detecting a pattern may require explicit modeling of each time cycle. Explicit modelling of each time cycle may require a substantial amount of data to be collected and stored before a pattern can be recognized.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

In the figures, components of a block diagram and operations of a flow diagram may be added to, removed from, modified, or combined. Functionality described in relation to one component/operation may instead be implemented by another component/operation. Accordingly, the specific components/operations illustrated and/or described herein should not be construed as limiting the scope of any of the claims.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW

The present disclosure describes a flexible technique to learn patterns in time series data that recur over time. The patterns may be used for simulation, predicting future behavior, or detecting anomalies in a system in which the data is collected. The technique incrementally detects daily, weekly, monthly, and yearly patterns. Each pattern is built incrementally over time instead of having to wait for all the data to be available at the beginning of the analysis. Each pattern is described in the context of a 24-hour day and formed based on time series data collected over an entire day. An example use of the technique is detecting load patterns in a computer system. Measurements of system load, such as CPU utilization, may be collected periodically throughout a day.

The techniques presented herein recognize different load patterns for the same load metric that recur over time. For example, typical behavior may be described as heavily loaded during the weekdays, that is, having a similar load from Monday to Friday and very little load on Saturdays and Sundays. The load on Sundays may differ from the load on Saturdays. For example, there may be a computationally intensive batch job that runs every Sunday for a couple of hours. Additionally or alternatively, the system may have a different load pattern on the 15th of each month.

Also, unused/infrequently used patterns may be expunged automatically. This allows many patterns to be modeled, without the fear of indiscriminate growth in the number of patterns.

Terminology

The following is a list of terms and the meaning of those terms as used herein.

Machine performance metrics: Machine performance metrics are data that is collected from which a machine load metric may be derived and stored as a datapoint in time series data. Any individual measure may be used as the machine load metric, or the machine load metric may be derived as an aggregation of multiple performance measurements. Examples of individual machine performance metrics that may be collected include CPU utilization, number of disc I/O's, number of log files accessed, number of transactions on a database, etc.

Time series data: Time series data is a set of data points representing data collected over the period of one day. Each data point in the time series data may comprise an individual measurement or an aggregation of multiple measurements that are collected at periodic intervals during the day.

Time series pattern: A time series pattern is a model that represents a set of similar time series data. The model is generated based on time series data that is similar to each other.

Candidate day: A day on which time series data is collected, and the date of the day is matched against rules to determine one or more day types that are satisfied by the date.

Day type: A day type is one or more rules for determining whether a candidate day satisfies the criteria specified by the day type. The day type rules include criteria for matching the date of the candidate day.

Calendar data: Calendar data is data associated with a date. Information associated with a date includes at least day of the week, day of the month, month of the year, and year. Calendar data may optionally provide holidays, corporate events, or other non-periodic events that may impact the pattern of data collection on the date.

Relative time period: A relative time period is a complex day type that specifies a range of dates. The range of dates is relative to a particular point in time that resolves to a particular date (e.g. "Christmas" resolves to December 25). Other dates in the range are proximate to the particular point in time.

Recurrence pattern: A recurrence pattern is a time series pattern that has been observed a sufficient number of times on a collection day of a particular day type. Thus, a recurrent pattern is an association between a time series pattern and a day type.

Opportunity days: Opportunity days are counted for each day type and represent the number of days on which time series data has been collected on a day whose date satisfies the corresponding day type criteria.

Occurrence days: Occurrence days are counted for each pair of a day type and a time series pattern. For each pair of particular day type and particular time series pattern, the number of occurrence days is the number of days on which the collected time series data matches the particular time series pattern and for which the date of the collection day satisfies criteria of the particular day type.

2. PATTERN DETECTION ARCHITECTURE

Figure 1:
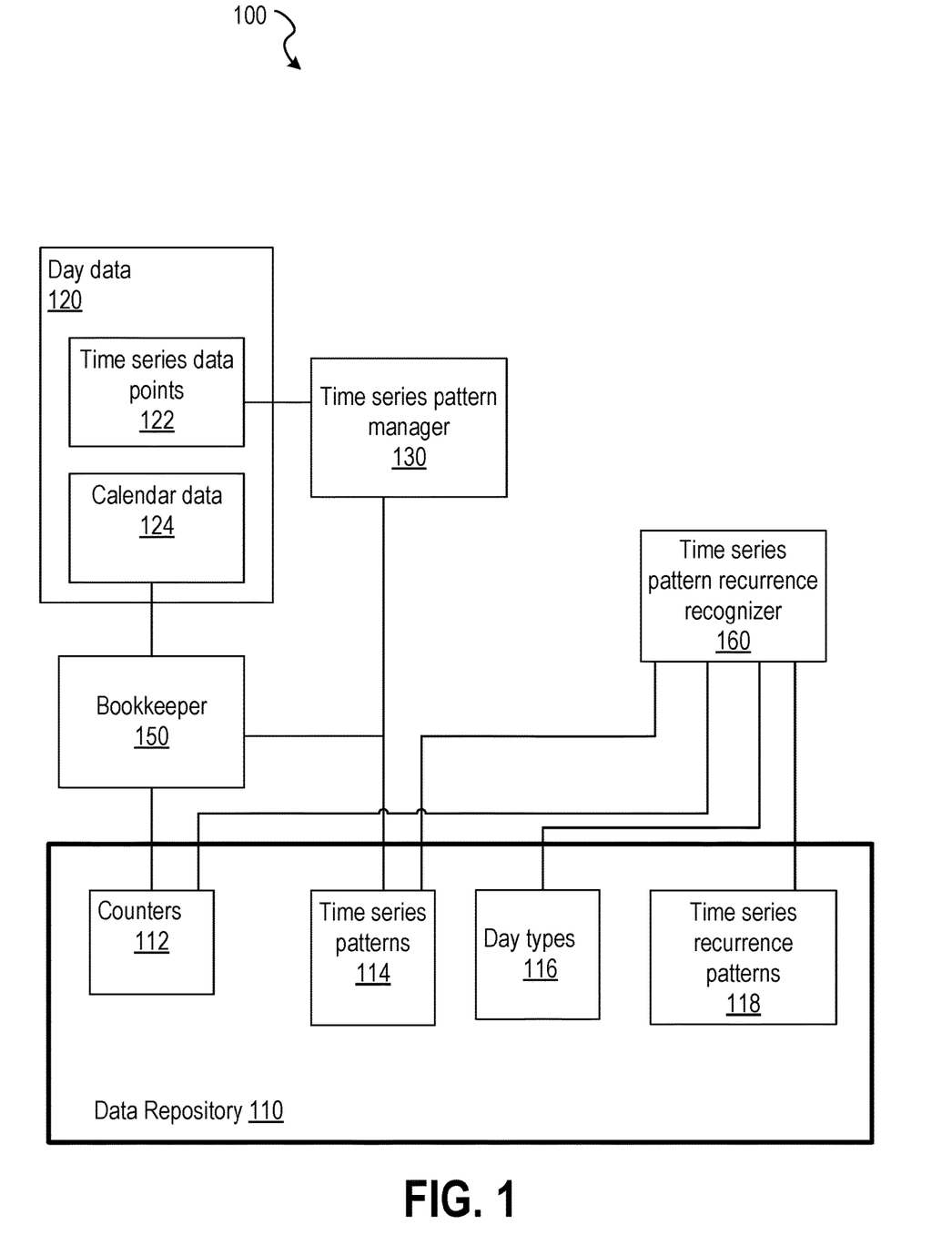
FIG. 1 is a block diagram that illustrates components of the system, in accordance with one or more embodiments.

FIG. 1 is a block diagram that illustrates components of the system, in accordance with one or more embodiments. Day data 120 represents the input to system 100. Day data 120 is data collected on a particular day. The data includes Time series data points 122 and Calendar data 124. In an embodiment, the time series data points 122 may include system performance metrics, and the time during the day when the observation was made. Anomalies detected in the system performance metrics may indicate one or more changes in system behavior.

For example, the CPU utilization may be recorded every 15 minutes, resulting in 96 data points in the series for a day. A data point within the time series may indicate that CPU utilization was 50% at 14:32 (24 hour clock). In an embodiment, any single metric of load may be recorded as a data point such as CPU utilization, disc I/O's, number of log files accessed, number of transactions on a database, etc. In an embodiment, the load metric may be an aggregation of multiple individual load measurements.

In an embodiment, time series data points may include business performance metrics. Anomalies, such as deviation from an established pattern detected in the business performance metrics, may indicate one or more changes being experienced by the business.

The calendar data 124 comprises at least the date, for example, Feb. 28, 2018. The date may be represented in any manner. In an embodiment, the day of the week may also be included in the calendar data (e.g. Wednesday) or alternatively, instead of storing the day of the week, the day of the week may be looked up in a table or computed based on the date. From the calendar data, information such as day of the week, weekday vs. weekend, holidays, day of the month, and week of the month may be determined and used for recognizing load patterns. The date information may also be matched against non-periodic events such as when a promotional campaign is in effect.

Data Repository 110 stores data that is input to and/or output from executable modules of the system. Data repository 110 stores at least Counters 112, Time series patterns 114, Day Types 116, and Time series recurrence patterns 118.

In one or more embodiments, a data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site.

Time series patterns 114 comprises a set of patterns, each pattern of which represents a set of similar time series data. In an embodiment, a time series pattern may be generated from a set of time series data using a Holt Winters algorithm (NIST/SEMATECH e-Handbook of Statistical Methods, Section 6.4.3.5: Triple Exponential Smoothing, April 2012). A set of distinct time series patterns may be stored in the repository. Each time series pattern matches one or more sets of time series data points 122 (also referred to as "time series data") input to the system. In an embodiment, each distinct time series pattern may be stored in association with one or more dates on which the collected time series data matches the pattern.

In an embodiment, once a time series data is matched to a time series pattern, the time series data may be discarded. Incrementally matching a day's time series data with a pattern may eliminate storage costs for storing bulk amounts of time series data.

A day type indicates the temporal aspect of a recurrence pattern. A day type may be a simple indication of a single day of the week, (e.g. Monday), a single day of the month (e.g. $1^{st}$, $15^{th}$, or last day), or single day of the year (e.g. Independence Day). A day type may also indicate a grouping of days such as a weekend day (Saturday or Sunday), a weekday (any of Monday through Friday), or last week of the month. In addition, a day type may represent an event having discrete dates that do not reoccur at fixed intervals. For example, a holiday day type may specify a set of discrete dates of holidays such as Thanksgiving whose date changes every year. Another example of a day type specified by non-periodic events may comprise the dates of a university's summer break such as June 1 through August 26. The actual dates of summer break may change from year to year. When time series data is collected on a particular date, a particular day type specifies criteria for determining whether the date qualifies as the particular day type. For example, if data is collected on Feb. 28, 2018, that date may satisfy the criteria for being classified as day types including a Wednesday and last day of the month. February 28 might also qualify as a school winter break day if such a day type is defined.

In an embodiment, a day type may have multiple constraints, such as a business day type constraining the date to be a weekday that is not a holiday or other scheduled business shutdown.

A day type may also specify a constraint that is a time period relative in time to a reference point-in-time (also referred to herein as a "relative time period"). A relative time period has a starting date and a range of dates that includes multiple days. In an embodiment, the starting date may be the reference point-in-time. The range of dates may be a specified number of days before or after the starting date. A candidate day may be classified as satisfying such a relative time period day type when the date for the candidate day matches a date that is included in the range of dates. In an embodiment, the specified number of days may also include a day type. The dates included in the range of dates may include dates that satisfy the specified day type of the range. For example, a day type might be "last business day of the month through 3 business days after the last business day of the month. The range of dates for this day type may start on the last business day of the month (the reference point in time), and the range includes dates for the next three business days. Another example day type may be "2 days before the $15^{th}$ of the month through the $15^{th}$ of the month." The dates in this example range depend on what day of the week the $15^{th}$ of the month falls. If the $15^{th}$ of the month falls on a Wednesday through Friday, then the date range includes [$13^{th}$, $14^{th}$, and $15^{th}$] of the month. If the $15^{th}$ falls on a Tuesday, then the date range includes [$11^{th}$, $14^{th}$, and $15^{th}$] because the $12^{th}$ (Saturday) and $13^{th}$ (Sunday) are not business days. If the $15^{th}$ is not a business day, then the $15^{th}$ is not included in the range of dates. In general, days are counted back from the $15^{th}$ and the date is included in the range if the day is a business day and the number of dates in the range has not yet been reached. When counting back, days that are not business days are skipped over.

In an embodiment, the range of dates for a relative time period may be specified by a number of weeks or months. Example, "10 weeks before Christmas until Christmas."

The reference point in time used for a relative time period may be a non-periodic event that uses information external to the system to match. For example, the reference point in time may be "the last day it rained" or "the last day the company had a sale," where the criteria for matching the reference point in time uses data retrieved from outside of the set of calendar data.

Time series recurrence patterns 118 stores time series recurrence patterns. A time series recurrence pattern is a time series pattern that is stored in association with a particular day type. A time series recurrence pattern is created and stored when the time series pattern is observed as re-occurring a sufficient number of times on days characterized by the same day type. For example, a time series recurrence pattern may comprise a particular time series pattern stored in association with a day type of Wednesday when the time series data matches the same time series pattern on a sufficient number of Wednesdays.

The set of executable modules includes Time Series Pattern Manager 130, Bookkeeper 150, and Time series pattern recurrence recognizer 160.

Time series pattern manager 130 analyzes time series data points 122 collected over a an entire day and assigns a matching time series pattern. An existing time series pattern may be assigned when the time series data points match the existing time series pattern. However, if the time series data is not similar enough to any pattern stored in time series patterns 114, a new uninitialized pattern may be generated from the time series data and stored in time series patterns 114. The uninitialized pattern is not a full model yet, and the time series data may be saved as part of, or in association with, the uninitialized pattern. When subsequently received time series data points are determined to be sufficiently similar to the saved time series data, a full, initialized model may be created using both sets of time series data points.

In an embodiment, Bookkeeper 150 takes input for one day. Bookkeeper 150 inputs Calendar data 124 and determines which of the day types are satisfied by the calendar data. Bookkeeper 150 may also receive as input the time series pattern that matches the time series data determined by the time series pattern manager 130.

In an embodiment, the set of day types determined by bookkeeper 150 may be stored in association with the calendar data and/or the time series pattern. An advantage of storing at least the date in association with the time series pattern is that the association may enable detection of non-periodic patterns that use additional information to detect. For example, a sliding window of the most recent dates on which a time series pattern has been observed may be presented to a human who may identify the dates as coinciding with an event. A new custom day type specification may be created using this human input. However, in such an embodiment, the date on which each pattern is observed may be recorded and retained for as long as the particular observation is included in the sliding window.

In an embodiment, the system may automatically consult a calendar of events to discover, without human input, a pattern based on dates of discrete events.

In an embodiment, bookkeeper 150 maintains a set of counters: one opportunity counter for each day type and one occurrence counter for each combination of time series pattern and day type. In such an embodiment, the opportunity counter for each of the day types satisfied by the calendar data is incremented. For example, an opportunity counter for a day type of weekend may be incremented when data is collected on a Saturday or Sunday. As another example, when data is collected on Dec. 1, 2018, opportunity counters for Saturday, weekend, and first of the month may be incremented. In addition, an occurrence counter representing each combination of time series pattern and day type may also be incremented.

Time series pattern recurrence recognizer 160 (hereinafter, shortened to pattern recurrence recognizer 160) discovers recurrence patterns in the data. In an embodiment, pattern recurrence recognizer 160 reviews opportunity and occurrence counters to determine whether pattern identification criteria is met.

3. CREATING TIME SERIES PATTERNS

Figure 2:
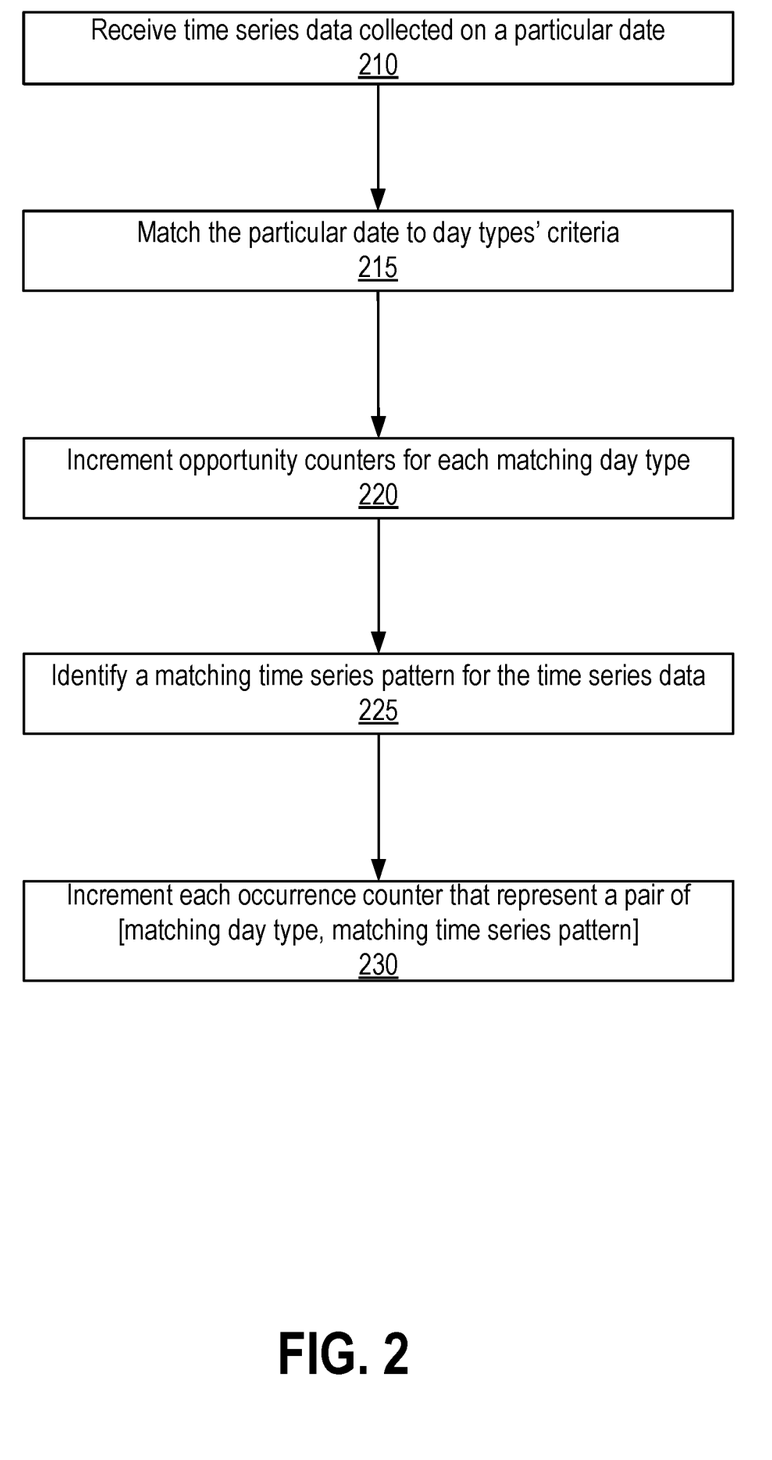
FIG. 2 is a flow diagram that illustrates creating time series patterns from time series data, in accordance with one or more embodiments.

As time series data is received comprising data points collected over an entire day, the time series data is either matched to an existing time series pattern or it is the basis of a new time series pattern. FIG. 2 is a flow diagram that illustrates creating time series patterns from time series data, in accordance with one or more embodiments. In Operation 210, the time series data is received that was collected on a single day having a particular date. In Operation 215, Bookkeeper 150 may determine a set of day types for the collection day. In an embodiment, the bookkeeper may increment a set of incremental opportunity counters each counter associated with a day type that is satisfied by the date (Operation 220).

Figure 4:
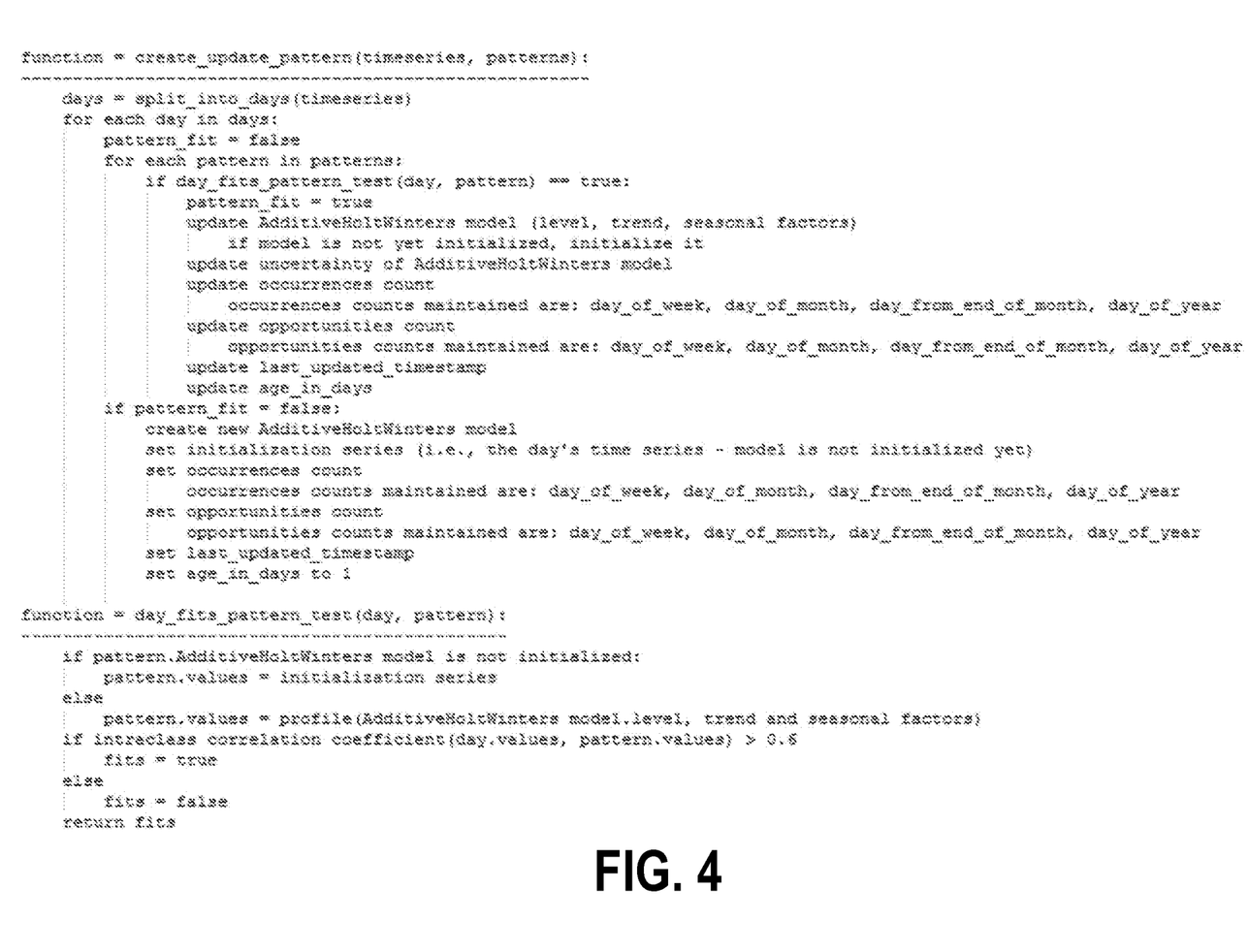
FIG. 4 illustrates example code that performs the creation and updating of time series patterns, in accordance with an embodiment.
Figure 6:
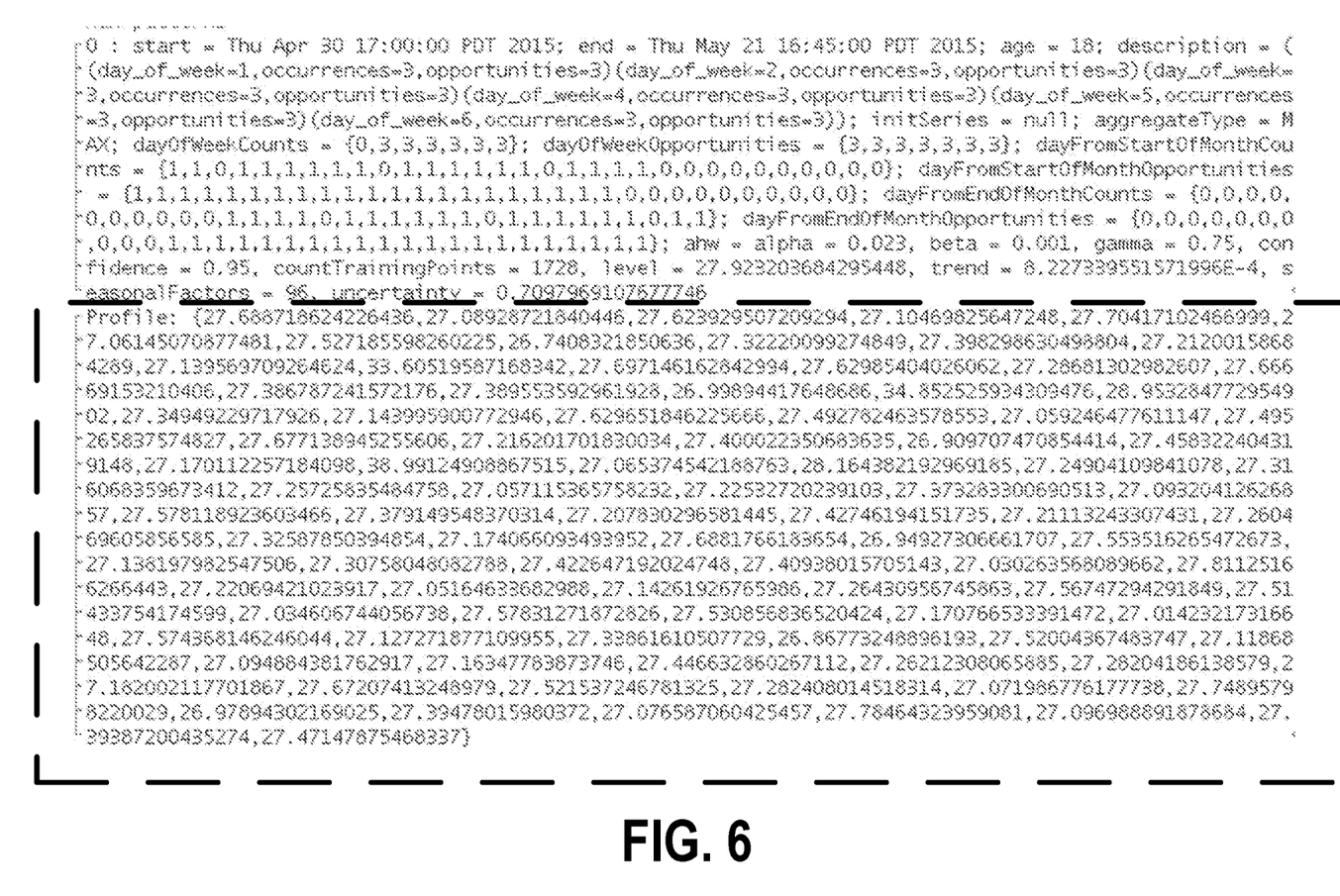
FIG. 6 illustrates an example model profile/time series data, in accordance with one or more embodiments.

In Operation 225, Time series pattern manager 130 may identify a matching time series pattern for the set of time series data points. FIG. 4 illustrates code that performs the creation and updating of time series patterns, in accordance with an embodiment. Time series pattern manager 130 compares the time series data to time series patterns stored in time series patterns 114. In an embodiment, the format of the time series data is the same as the model profile. FIG. 6 illustrates an example model profile/time series data, in accordance with one or more embodiments. The box with the dashed lines surrounds the profile portion of the model.

A function may use a pattern-magnitude coefficient such as intra-class correlation coefficient on the incoming time series data and the model profile to determine whether the time series data is sufficiently similar to the model. If the time series data is sufficiently similar to a known time series pattern, then the model for the matching time series pattern is updated with the incoming time series data. In an embodiment, time series pattern manager 130 may update the existing pattern based on the new time series data using an Additive Holt Winters model. Updating the model may involve updating the level, trend, and seasonal (i.e. time re-occurrence) factors as well as modifying the values for each of the seasonal factors. An updated model profile may be generated from the model. In addition, in an embodiment, an age counter may be incremented to indicate how many times the pattern has been updated, and/or the date of last update may be updated with the current date.

In Operation 230, Bookkeeper 150 may increment each occurrence counter associated with a pair of (day types satisfied by the date, time series pattern matched by the time series data). For example, if two day types (daytype1 and daytype 2) were satisfied by the date on which the data was collected, and two time series patterns (pattern1, pattern2) were matched to the time series data, then occurrence counters would be incremented for (day type1, pattern 1), (daytype1, pattern2), (daytype2, pattern 1), (daytype2, pattern 2).

In an alternate embodiment, instead of using counters, some combination of date, day type, and matching time series pattern may be stored for later query. For example, each incoming day data 120 may be stored as a record including at least the calendar data and the time series pattern that matches the time series data. In an embodiment, an indication of all day types that are satisfied by the calendar data may also be stored.

In an embodiment, incrementing counters rather than storing dates in association with an occurrence of a time series pattern may reduce the amount of storage space needed to recognize a pattern. In an alternate embodiment, the incoming data may be stored for later search. For example, each incoming day data 120 may be stored as a record including at least the calendar data and the time series pattern that matches the time series data. In an embodiment, an indication of all day types that are satisfied by the calendar data may also be stored.

4. RECOGNIZING A RECURRENCE PATTERN

As explained above, a recurrence pattern is a re-occurrence of observing a particular time series pattern on a particular day type. Recognizing a recurrence pattern may be based on both (a) the opportunity counter crossing an opportunity threshold and (b) a ratio of the occurrence counter to an opportunity counter crossing the ratio threshold.

Figure 3:
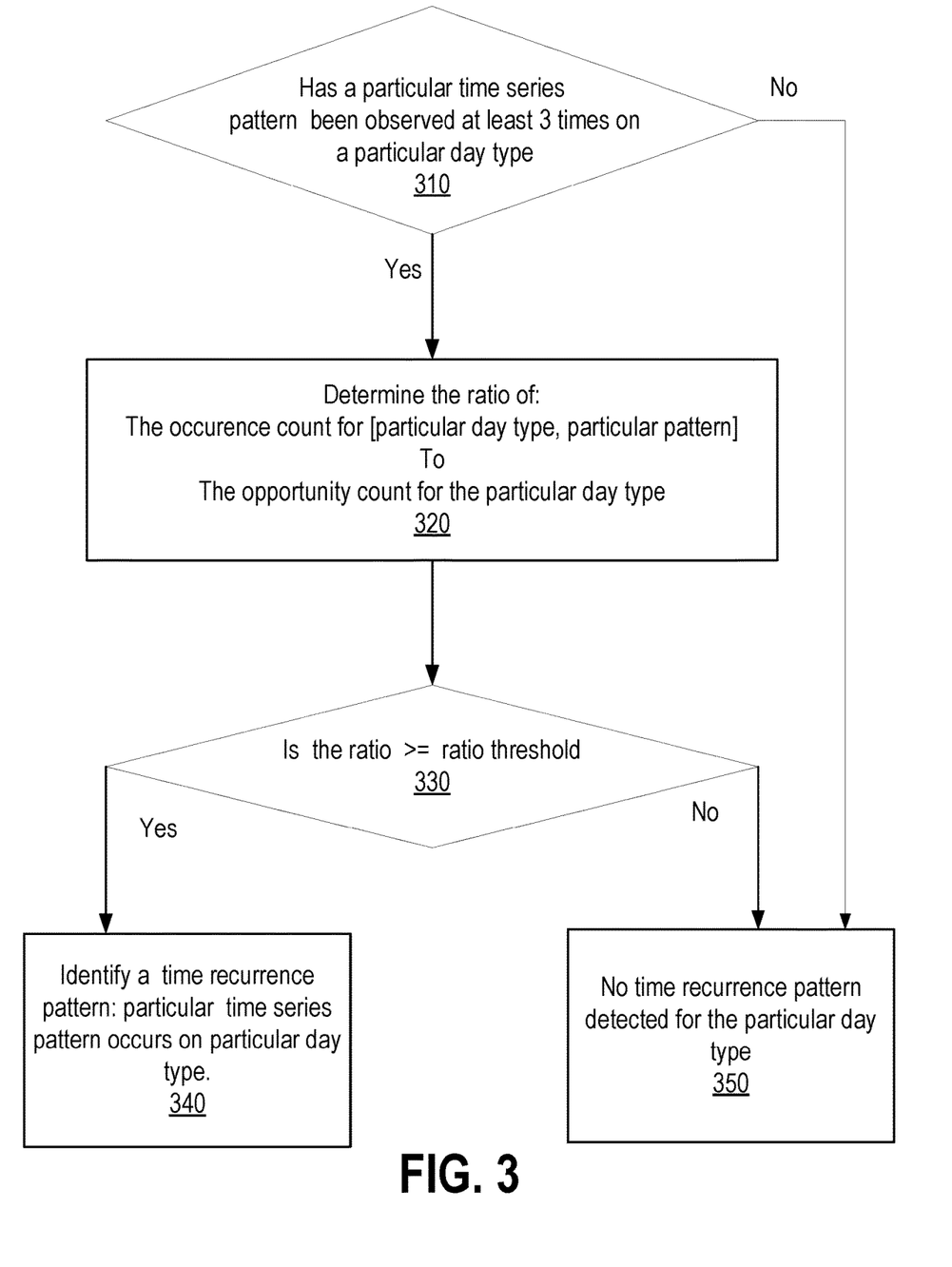
FIG. 3 is a flow diagram that illustrates recognizing time series patterns that re-occur on particular day types, in accordance with one or more embodiments.

FIG. 3 is a flow diagram that illustrates recognizing time series patterns that re-occur on particular day types, in accordance with one or more embodiments. In particular, the flow in FIG. 3 illustrates determining whether there is a particular recurring time series pattern that is often observed on a particular day type. An opportunity threshold number of days may be established to represent a minimum number of data collection days needed to recognize a recurring pattern. The value of the opportunity counter for a day type may be compared against the opportunity threshold number of days. If the value of the opportunity counter meets or exceeds the threshold, then the pattern recurrence recognizer may recognize a recurrence pattern for the particular day type (Operation 310). In the example flow, the configured minimum number of days to recognize a pattern is 3. That is, in the example, a recurrence pattern can be recognized when data has been collected on at least 3 days of the particular day type. If the opportunity counter for the particular day type does not meet or exceed the configured threshold number of days, then the flow continues in Operation 350, where pattern recurrence recognizer 160 determines that there is no recurrence pattern for the particular day type.

If enough data has been collected to establish a recurrence pattern for the day type, then the flow proceeds to Operation 320. In Operation 320, the pattern recurrence recognizer determines a ratio of:(a) the number of occurrence days on which the particular time series pattern has been observed on the particular day type to (b) the number of opportunity days on which data was collected that satisfy the criteria of the particular day type.

A recurrence pattern is a time series pattern that occurs (i.e. is observed) for a sufficiently high percentage of days that match a day type. In Operation 330, pattern recurrence recognizer 160 compares the ratio of occurrence days to opportunity days against a threshold that represents the minimum percentage for recognizing a recurrence pattern. If the ratio crosses the ratio threshold, then a stable recurrence pattern may be recognized. The ratio threshold may be a ratio between 0 and 1. In an embodiment, the ratio threshold may be a ratio of 3:5 (represented by a number 0.6). For example, if time series data has been collected on 40 Mondays, but the time series pattern occurred on 20 of the 40 Mondays, then the occurrence ratio would be 0.5, which does not meet or exceed a threshold of 0.6. Thus, there would be no recurrence pattern of the particular time series pattern on Mondays. However, if the particular time series pattern occurred on 30 of the 40 Mondays, then the ratio would be 0.75, and the particular time series pattern occurring on Mondays would be established as a recurrence pattern.

Pattern recurrence recognizer 160 may store, in time series recurrence patterns 118, a recurrence pattern comprising the time series pattern associated with the day type (Operation 340). If in Operation 330, the ratio does not meet or exceed the ratio threshold, then in Operation 350 it is determined that there is no recurrence pattern for the particular time series pattern on the particular day type.

In an embodiment, pattern recurrence recognizer 160 may attempt to find a weekly pattern first before attempting to find a monthly pattern. A weekly pattern is a pattern for a weekly day type, and a monthly pattern is a pattern for monthly day type. A weekly day type is a day type whose specification uses the day of the week (Monday through Sunday) portion of the calendar data to determine whether the day type is satisfied. For example, a weekday day type is satisfied when the day on which data was collected is a Monday, Tuesday, Wednesday, Thursday, or Friday. A monthly day type is a day type whose specification uses the day of the month portion of the calendar data to determine whether the day type is satisfied. For example, a day type that is satisfied on the first of the month, the $15^{th}$ of the month, or the last day of the month are monthly day types. In an embodiment, if a weekly pattern is recognized, then pattern recurrence recognizer 160 may not look for a monthly pattern. In an alternate embodiment, pattern recurrence recognizer 160 may attempt to find a monthly pattern even when a weekly pattern is recognized.

In an embodiment, pattern recurrence recognizer 160 may also attempt to find a yearly pattern using a day type whose specification relies on both the day of the month and the month from the calendar data. Examples of annual day types are every December 25 (Christmas day) and every February 14 (Valentine's day).

In an embodiment in which the opportunity and occurrence counters are updated incrementally upon receiving one day's worth of data, a pattern may be recognized based on these counters without needing to access the collected day data 120. Thus, the day data 120 need not be stored in a repository for later retrieval. In such an embodiment, once the collected day data 120 is processed by the bookkeeper, the incoming day data may be discarded, requiring less storage space for the system.

In an alternate embodiment, the values for the opportunity and occurrence counters are determined by querying a repository of stored data rather than incrementing the counters as the day data is processed. For example, as each day's data is received, a record may be created and stored that associates the date with the time series pattern, and each day type satisfied by the date. Instead of incrementing counters, the stored records may be queried, and the counters assigned to the number of results returned from the query.

5. DETECTING ANOMALOUS BEHAVIOR

Once a recurrence pattern has been established for a day type, subsequently received time series data may be considered to represent anomalous system behavior if the time series data does not match a recurrence pattern established for a day type matching the date on which the data was collected. In an embodiment, a notification may be presented that indicates the detected anomaly. The degree to which the collected day differs from a pattern may be considered before creating a notification. Thus, an anomaly threshold may be established such that a notification is created when the difference between the incoming time series data and a recurrence pattern established for a day type matching the collection day meets or exceeds the anomaly threshold. In an embodiment, a count may be maintained for each recurrence pattern that is incremented each time an incoming time series data does not match the recurrence pattern. In an embodiment, a notification may be delayed until the number of anomalies crosses a threshold.

6. EXAMPLE

Figure 5:
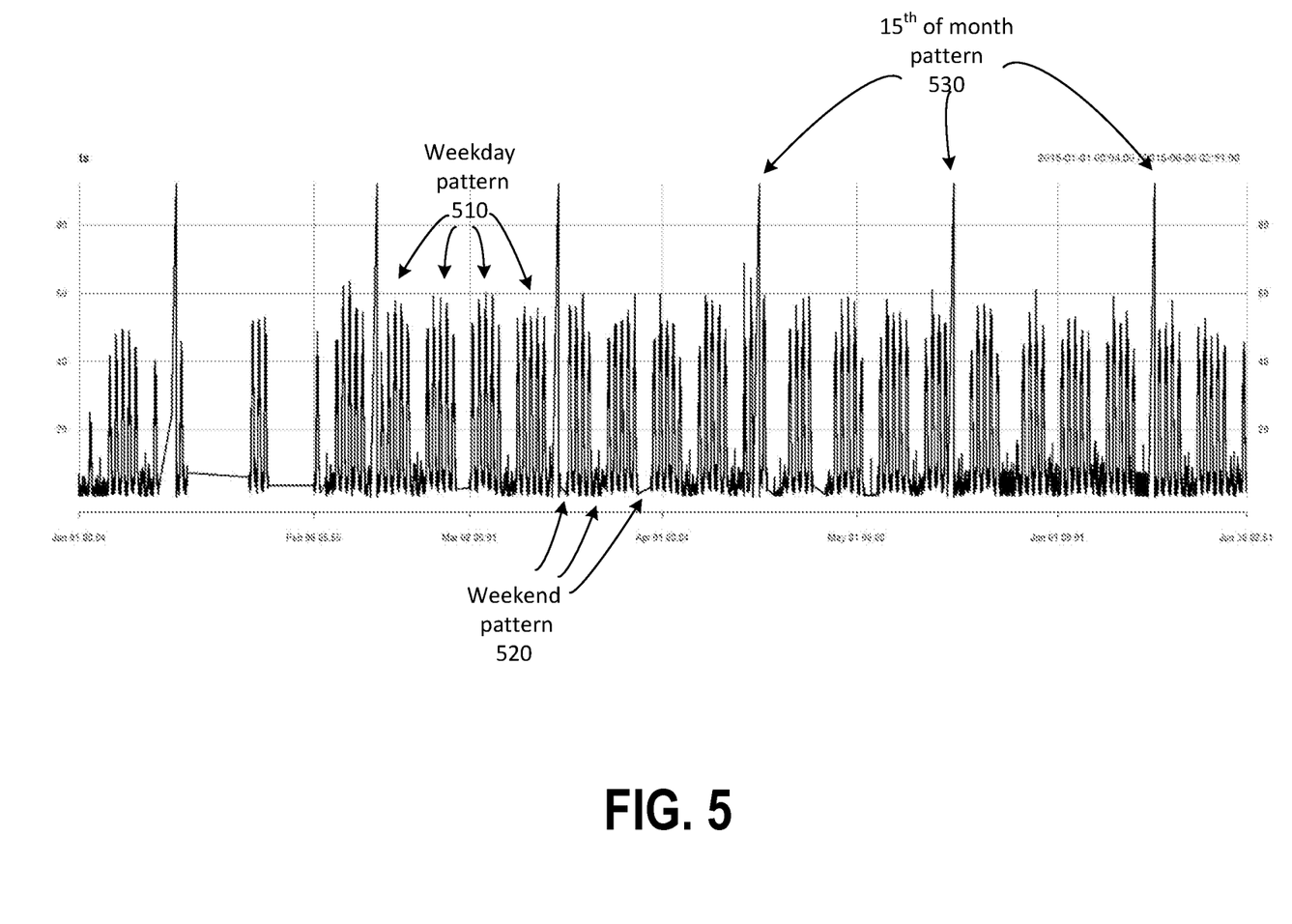
FIG. 5 illustrates a graph of time series data collected over a 6 month period, in accordance with one or more embodiments.

FIG. 5 illustrates a graph of time series data collected over a 6 month period. By inspection, three distinct patterns can be seen. One pattern starting at the beginning of February occurs during most weekdays in which the load ranges between 40 and 60 measured units. A second pattern can be observed on Saturday and Sunday in which the load ranges between 0 and 10 units. A third pattern can be observed at mid-month, in which the load soars to about 90 units.

7. GARBAGE COLLECTION TO MINIMIZE STORAGE SPACE

Over time, many time series patterns may be created along with the corresponding occurrence counters for each defined day type. However, observed patterns may evolve over time. Some of the patterns may not have been observed recently and others may have merged, resulting in duplicate patterns. It may be advantageous to free storage space taken by unused patterns and their associated bookkeeping data.

In an embodiment, a pattern may be removed from the system based on the age counter and/or the date of last update. The age counter relative to the total number of days on which time series data has been collected may indicate the frequency of occurrence of the pattern (independent of any particular day type). The date of last update may indicate how recently this pattern has been observed. Thresholds may be established for a pattern observance frequency below which a pattern and associated data may be removed. Similarly, patterns may be removed that have not been updated recently (within a threshold amount of time in the past). In an embodiment, multiple cleanup levels may be defined, with each level defining a distinct set of thresholds. For example, a cleanup level 1 may define a last update threshold to be two weeks. When the system is configured with cleanup level 1, patterns that have not been updated within the last two weeks may be removed. A cleanup level 2 may define a last updated of a longer period of time, for example, 2 months. A cleanup level 3 may define a last updated threshold of a number of years.

In addition, sometimes two patterns may merge into a single pattern. That can happen when time series data collected for a day may be similar to an existing pattern but not close enough to be considered a match for the existing pattern. In that case, a new pattern may be created for the new time series data. However, because the new pattern and the existing pattern are close, a subsequent day's time series data may match both the new and the existing pattern. Both matching patterns may be updated with the subsequent day's time series data, which may bring the two patterns even closer together until they eventually match. When two existing patterns match, they may be consolidated into a single pattern. To clean up duplicate patterns, each pair of patterns may be compared. Groups of patterns may be created with each pattern in the group sufficiently close to the others to be considered a duplicate pattern. Within each group, the pattern having been observed the most (that is, the oldest pattern) may be retained in the system, and the other duplicate patterns in the group may be discarded.

8. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a micro service, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other micro services. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the micro service application to provide, store, or display the output, for example, as a data model or as aggregate data that describes a data model.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
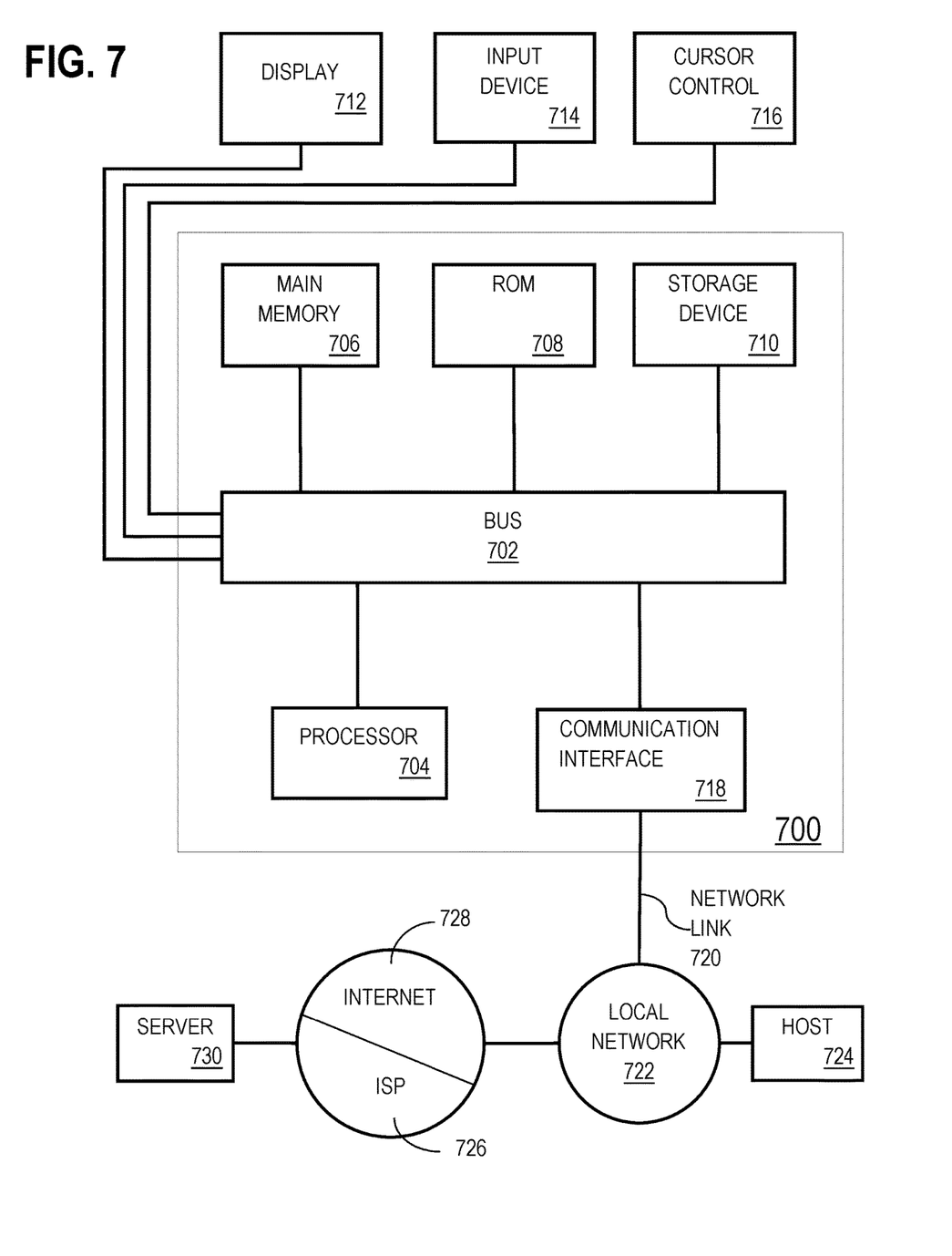
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more hardware processors, cause:
    identifying a particular time series pattern that matches a set of data points, the set of data points comprising machine performance metrics collecting during one particular collection day;
    creating a set of matching day types, each day type of the set of matching day types specifying criteria satisfied by calendar data associated with the particular collection day;
    determining a first number of opportunity days for a particular day type of the set of matching day types;
    determining a first number of occurrence days for a combination of both (a) the particular day type and (b) the particular time series pattern;
    determining a ratio of (c) the first number of occurrence days that are associated with the particular day type and the particular time series pattern and (d) the first number of opportunity days that are associated with the particular day type;
    responsive to determining that the ratio meets recurrence pattern identification criteria, identifying the particular time series pattern as a recurrence pattern associated with the particular day type;
    subsequent to the one particular collection day, receiving second machine performance metrics collecting during a second day;
    determining that second calendar data associated with the second day matches a second day type associated with a second recurrence pattern,
    responsive to determining that the second machine performance metrics collecting during a second day does not match the second recurrence pattern, sending a signal to indicate that the second machine performance metrics collecting during the second day represents anomalous behavior.

2. The media of claim 1, wherein criteria specified by the day type is based the calendar data of the particular collection day and one of: (a) day of a week and (b) day of a month.

3. The media of claim 1, wherein the day type comprises one of: (a) every Monday, (b) every weekday, (c) every weekend day, and (d) every first day of a month, and (e) every last week of a month.

4. The media of claim 1, wherein the particular day type of the set of matching day types is a relative time period having criteria that specifies a range of dates, the relative time period criteria comprising:
    a reference point-in-time;
    an indication of whether the range of dates in the relative time period starts or ends with the reference point in time; and
    one of: a number of days, a number of weeks, and a number of months before or after the reference point in time.

5. The media of claim 4, wherein the relative time period criteria:
    (a) specifies (i) the number of days and (ii) that the reference point in time is the earliest date of the range of dates; and
    (b) further comprises a range day type for dates in the range of dates; and the media further storing instructions which, when executed by the one or more hardware processors, cause:
    determining the dates to include in the range of dates by:
    (c) including the reference point in time in the range of dates;
    (d) determining whether the next day immediately following the reference point in time satisfies the range day type;
    (e) responsive to determining that the next day satisfies the range day type, incrementing a counter and including the next day in the range of dates;
    (f) shifting the next day to be the day to be the immediately following day;
    (g) continue performing (e) and (f) until the value of the counter exceeds the number of days in the date range;

wherein a candidate day satisfies the relative time period day type when the candidate day matches one of the dates included in the range of dates.

6. The media of claim 4, wherein the relative time period criteria:
   (a) specifies (i) the number of days and (ii) the reference point in time is the latest date in the range of dates; and
   (b) further comprises a range day type for dates in the range of dates; and
   the media further storing instructions which, when executed by the one or more hardware processors, cause:
      determining the dates to include in the range of dates by:
         (c) including the reference point in time in the range of dates;
         (d) determining whether the preceding day immediately before the reference point in time satisfies the range day type;
         (e) responsive to determining that the preceding day satisfies the range day type:
            increment a counter;
            include the preceding day in the range of dates;
         (f) shifting the preceding day to be the immediately preceding day;
         (g) continue performing (e) and (f) until the value of the counter exceeds the number of days in the date range;
   wherein a candidate day satisfies the relative time period day type when the candidate day matches one of the dates included in the range of dates.

7. The media of claim 1, the media further storing instructions which, when executed by the one or more hardware processors, cause:
   receiving data collected during a particular day comprising a set of time series data points and calendar data; and
   determining a time series pattern that matches the set of time series data points collected during the particular day.

8. The media of claim 7, wherein determining a time series pattern that matches the set of time series data points comprises:
   comparing the set of time series data points against each of a set of time series patterns;
   responsive to finding a one or more matching time series patterns that each match the set of time series data points, updating each of the one or more matching time series patterns to include the set of time series data points; and
   responsive to not finding any matching time series pattern, initializing a new time series pattern for the set of time series data points.

9. The media of claim 8, the media further storing instructions which, when executed by the one or more hardware processors, cause:
   determining one or more day types having criteria satisfied by the calendar data;
   incrementing a first opportunity counter associated with each day type of the one or more day types;
   incrementing a first occurrence counter for each pair comprising both (a) a particular day type of the one or more day types having criteria satisfied by the calendar data and (b) a time series pattern of the one or more matching time series patterns.

10. The media of claim 1, wherein determining that the ratio meets recurrence pattern identification criteria is responsive to determining that the first number opportunity days is at least a threshold number of days.

11. The media of claim 10, wherein the threshold number of days is at least 3.

12. The media of claim 1, wherein the ratio meets the recurrence pattern identification criteria when the ratio is at least 0.6.

13. A system comprising:
   at least one hardware device including a processor; and
   the system configured to perform:
      identifying a particular time series pattern that matches a set of data points, the set of data points comprising machine performance metrics collecting during one particular collection day;
      creating a set of matching day types, each day type of the set of matching day types specifying criteria satisfied by calendar data associated with the particular collection day;
      determining a first number of opportunity days for a particular day type of the set of matching day types;
      determining a first number of occurrence days for a combination of both (a) the particular day type and (b) the particular time series pattern;
      determining a ratio of (c) the first number of occurrence days that are associated with the particular day type and the particular time series pattern and (d) the first number of opportunity days that are associated with the particular day type;
      responsive to determining that the ratio meets recurrence pattern identification criteria, identifying the particular time series pattern as a recurrence pattern associated with the particular day type;
      subsequent to the one particular collection day, receiving second machine performance metrics collecting during a second day;
      determining that second calendar data associated with the second day matches a second day type associated with a second recurrence pattern,
      responsive to determining that the second machine performance metrics collecting during a second day does not match the second recurrence pattern, sending a signal to indicate that the second machine performance metrics collecting during the second day
      represents
      anomalous behavior.

14. A method comprising:
   identifying a particular time series pattern that matches a set of data points, the set of data points comprising machine performance metrics collecting during one particular collection day;
   creating a set of matching day types, each day type of the set of matching day types specifying criteria satisfied by calendar data associated with the particular collection day;
   determining a first number of opportunity days for a particular day type of the set of matching day types;
   determining a first number of occurrence days for a combination of both (a) the particular day type and (b) the particular time series pattern;
   determining a ratio of (c) the first number of occurrence days that are associated with the particular day type and the particular time series pattern and (d) the first number of opportunity days that are associated with the particular day type;
   responsive to determining that the ratio meets recurrence pattern identification criteria, identifying the particular time series pattern as a recurrence pattern associated with the particular day type;
subsequent to the one particular collection day, receiving second machine performance metrics collecting during a second day;
determining that second calendar data associated with the second day matches a second day type associated with a second recurrence pattern,
responsive to determining that the second machine performance metrics collecting during a second day does not match the second recurrence pattern, sending a signal to indicate that the second machine performance metrics collecting during the second day
represents
anomalous behavior.

\* \* \* \* \*

UNITED STATES PATENT AND TRADEMARK OFFICE
CERTIFICATE OF CORRECTION

| | | |
|---|---|---|
| PATENT NO. | : 11,023,350 B2 | Page 1 of 1 |
| APPLICATION NO. | : 16/256228 | |
| DATED | : June 1, 2021 | |
| INVENTOR(S) | : Salunke et al. | |

It is certified that error appears in the above-identified patent and that said Letters Patent is hereby corrected as shown below:

In the Drawings

On sheet 3 of 7, in FIG. 3, and on the title page, the print figure, under Reference Numeral 320, Line 2, delete "occurence" and insert -- occurrence --, therefor.

In the Specification

In Column 1, Line 53, delete "embodiments;" and insert -- embodiments. --, therefor.

In Column 5, Line 64, delete "a an" and insert -- an --, therefor.

In Column 7, Line 34, delete "daytype 2" and insert -- daytype2 --, therefor.

In Column 7, Line 37, delete "day type1" and insert -- daytype1 --, therefor.

In Column 7, Line 37, delete "pattern 1)," and insert -- pattern1), --, therefor.

In Column 7, Line 38, delete "pattern 1)," and insert -- pattern1), --, therefor.

In Column 7, Lines 38-39, delete "pattern 2)." and insert -- pattern2). --, therefor.

In the Claims

In Column 18, Line 27, in Claim 2, after "based" insert -- on --.

Signed and Sealed this
Thirty-first Day of May, 2022

Katherine Kelly Vidal
*Director of the United States Patent and Trademark Office*